United States Patent
Yamanaka et al.

(10) Patent No.: US 10,401,198 B2
(45) Date of Patent: Sep. 3, 2019

(54) POSITION DETECTION APPARATUS AND MOTION GUIDE APPARATUS WITH POSITION DETECTION APPARATUS

(71) Applicant: THK CO., LTD., Tokyo (JP)

(72) Inventors: Shuhei Yamanaka, Tokyo (JP); Yoshinobu Moriyuki, Tokyo (JP); Takashi Oshida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 15/772,279

(22) PCT Filed: Oct. 14, 2016

(86) PCT No.: PCT/JP2016/080463
§ 371 (c)(1),
(2) Date: Apr. 30, 2018

(87) PCT Pub. No.: WO2017/073349
PCT Pub. Date: May 4, 2017

(65) Prior Publication Data
US 2018/0321060 A1    Nov. 8, 2018

(30) Foreign Application Priority Data

Oct. 28, 2015 (JP) ................... 2015-211543

(51) Int. Cl.
*G01D 5/347* (2006.01)
*G01D 5/245* (2006.01)
(Continued)

(52) U.S. Cl.
CPC ......... *G01D 5/2451* (2013.01); *F16C 29/005* (2013.01); *F16C 29/0633* (2013.01);
(Continued)

(58) Field of Classification Search
CPC .................................... G01D 5/2451
(Continued)

(56) References Cited

U.S. PATENT DOCUMENTS 5,359,245 A    10/1994  Takei
5,434,602 A *  7/1995  Kaburagi ............... B41J 19/207
                                                         318/653
(Continued)

FOREIGN PATENT DOCUMENTS

CN    101122455    2/2008
CN    102301204    12/2011
(Continued)

OTHER PUBLICATIONS

International Search Report, PCT/JP2016/080463, dated Nov. 15, 2016.
(Continued)

*Primary Examiner* — George B Bennett
(74) *Attorney, Agent, or Firm* — Young & Thompson (57) ABSTRACT

A position detection apparatus is provided which eliminates the necessity of space to affix a scale to a track member. A track member of a motion guide apparatus is provided with a through hole into which a fastening member to fasten the track member to a base can be inserted. A carriage that is movably assembled to the track member via a rolling element is provided with magnets generating a magnetic field toward the track member. Magnetic sensors that detect a change in the magnetic fields of the magnets with the travel of the magnets relative to the track member are placed within the magnetic fields of the magnets.

20 Claims, 11 Drawing Sheets (51) Int. Cl.
  *F16C 41/00*  (2006.01)
  *G01B 7/00*  (2006.01)
  *F16C 29/00*  (2006.01)
  *G01D 5/244*  (2006.01)
  *G01D 5/14*  (2006.01)
  *F16C 29/06*  (2006.01)
  *F16C 29/04*  (2006.01)
(52) U.S. Cl.
  CPC ............ *F16C 41/00* (2013.01); *F16C 41/007* (2013.01); *G01B 7/003* (2013.01); *G01D 5/147* (2013.01); *G01D 5/245* (2013.01); *G01D 5/24409* (2013.01); *F16C 29/04* (2013.01); *F16C 2233/00* (2013.01)
(58) Field of Classification Search
  USPC .................................................... 33/706, 708
  See application file for complete search history.

(56) References Cited

U.S. PATENT DOCUMENTS

| | | | |
|---|---|---|---|
| 5,945,824 | A | 8/1999 | Obara et al. |
| 6,054,783 | A | 4/2000 | Philipp et al. |
| 6,236,200 | B1 | 5/2001 | Nekado et al. |
| 6,578,283 | B2 * | 6/2003 | Nishi ................. G01D 5/34753 33/706 |
| 7,765,711 | B2 * | 8/2010 | Schneeberger ....... F16C 29/005 33/706 |
| 2002/0129508 | A1 | 9/2002 | Blattner et al. |
| 2007/0227438 | A1 * | 10/2007 | Howley ............... G01D 5/2451 116/323 |
| 2007/0256313 | A1 * | 11/2007 | McAdam ............. G01D 5/2451 33/706 |
| 2010/0031524 | A1 | 2/2010 | Schneeberger et al. |
| 2011/0196635 | A1 * | 8/2011 | Sheu .................... G01D 5/145 702/65 |
| 2011/0271540 | A1 | 11/2011 | Henshaw |
| 2011/0273166 | A1 | 11/2011 | Salt et al. |
| 2015/0219434 | A1 | 8/2015 | Tsuji et al. |
| 2016/0084676 | A1 * | 3/2016 | Moriyuki ............. G01D 5/2457 324/207.24 |
| 2016/0215825 | A1 * | 7/2016 | Yoshida .............. F16C 29/0602 |
| 2017/0016483 | A1 | 1/2017 | Sakagami |
| 2019/0086241 | A1 * | 3/2019 | Joachimsthaler .... G01D 5/2451 |

FOREIGN PATENT DOCUMENTS

| | | |
|---|---|---|
| CN | 102317034 | 1/2012 |
| CN | 102317743 | 1/2012 |
| CN | 104819682 | 8/2015 |
| DE | 19547686 A1 | 6/1997 |
| DE | 19922363 A1 | 11/2000 |
| EP | 2402719 | 1/2012 |
| EP | 2533018 | 5/2014 |
| JP | 10-061664 | 3/1998 |
| JP | 2008-144799 | 6/2008 |
| JP | 2015-175417 | 10/2015 |
| KR | 10-1998-0087190 | 12/1998 |
| KR | 10-2012-0137285 | 12/2012 |
| WO | WO2007/003065 | 1/2007 |

OTHER PUBLICATIONS

German Office Action, dated Jul. 11, 2018, from corresponding German Patent Application No. DE 112016004941.2.
Korean Office Action for Application No. 10-2018-7014516, dated Sep. 21, 2018, with English translation provided.
Chinese Office Action for Application No. 201680062571.5, dated Oct. 8, 2018, with English translation provided.

* cited by examiner

ENLARGED VIEW OF PART IV

POSITION DETECTION APPARATUS AND MOTION GUIDE APPARATUS WITH POSITION DETECTION APPARATUS

TECHNICAL FIELD

The present invention relates to a position detection apparatus used for a motion guide apparatus where a carriage is assembled to a track member via a rolling element in such a manner as to be relatively movable.

BACKGROUND ART

A motion guide apparatus where a carriage is assembled to a track member via a rolling element in such a manner as to be relatively movable is known as a motion guide apparatus that guides linear motion of a movable body, such as a table, of a machine tool. The rolling element is interposed between the track member and the carriage; accordingly, it is possible to eliminate a gap between the track member and the carriage and support the movable body with high rigidity. Moreover, the rolling element performs rolling motion between the track member and the carriage; accordingly, the movable body performs smooth linear motion.

A magnetic or optical scale that is affixed to the track member is known as the position detection apparatus used for the motion guide apparatus. A magnetic or optical sensor that reads the scale is attached to the carriage (refer to, for example, Patent Literature 1). The track member is provided with a groove along a longitudinal direction. The scale is fitted in the groove.

CITATION LIST

Patent Literature

Patent Literature 1: JP 2008-144799 A

SUMMARY OF INVENTION

Technical Problem

However, the known position detection apparatus needs to secure space to affix the scale to the track member. A small motion guide apparatus has a problem that it is difficult to secure the space.

Hence, an object of the present invention is to provide a position detection apparatus that can eliminate the necessity of space to affix a scale to a track member.

Solution to Problem

In order to solve the above issue, the present invention is a position detection apparatus including: a track member including a through hole where a fastening member to fasten the track member to a base is insertable, to which a carriage is movably assembled via a rolling element; a magnet generating a magnetic field toward the track member; and a magnetic sensor placed within the magnetic field, the magnetic sensor being configured to detect a change in the magnetic field of the magnet with the travel of the magnet relative to the track member.

Advantageous Effects of Invention

According to the present invention, a through hole of a track member is used as a scale. Accordingly, space to affix the scale to the track member is not required. Moreover, the track member itself is the scale. Accordingly, an inexpensive position detection apparatus is obtained. The present invention is suitable for a small motion guide apparatus, but is not limited to the small motion guide apparatus. Moreover, it is possible to run fastening members through all the through holes of the track member, and is also possible to run fastening members through only every other or every two through holes and so on that are necessary for fastening.

DESCRIPTION OF EMBODIMENTS

A motion guide apparatus with a position detection apparatus in an embodiment of the present invention is described in detail hereinafter on the basis of the accompanying drawings. However, the present invention can be embodied in various modes, and is not limited to the embodiment described in the description. The description is fully disclosed to provide the embodiment with the intention of allowing those skilled in the art to fully understand the scope of the invention. The same reference numerals are assigned to the same components in the accompanying drawings.

Figure 1:
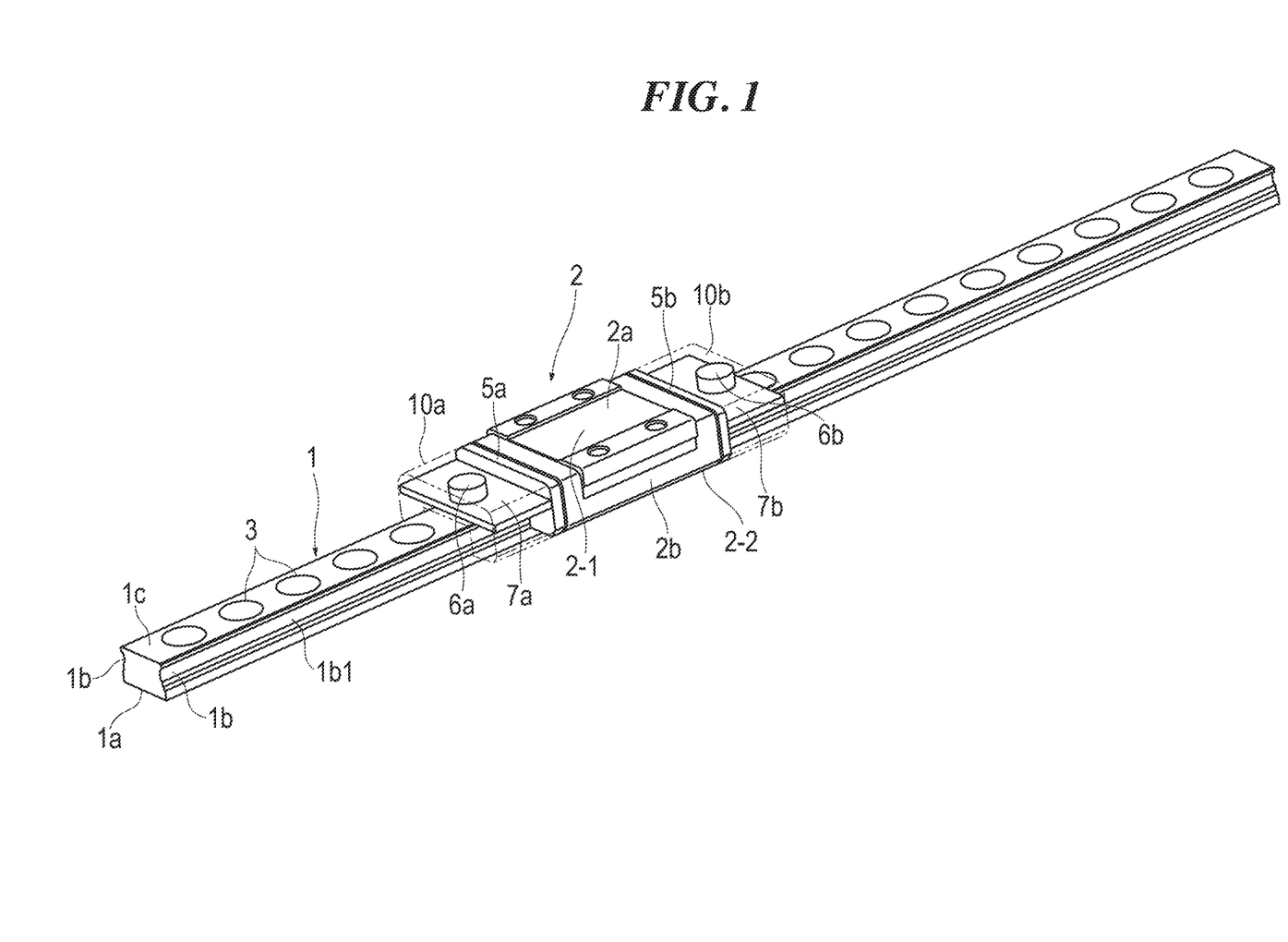
FIG. 1 is an external perspective view of a motion guide apparatus with a position detection apparatus in a first embodiment of the present invention.
Figure 2:
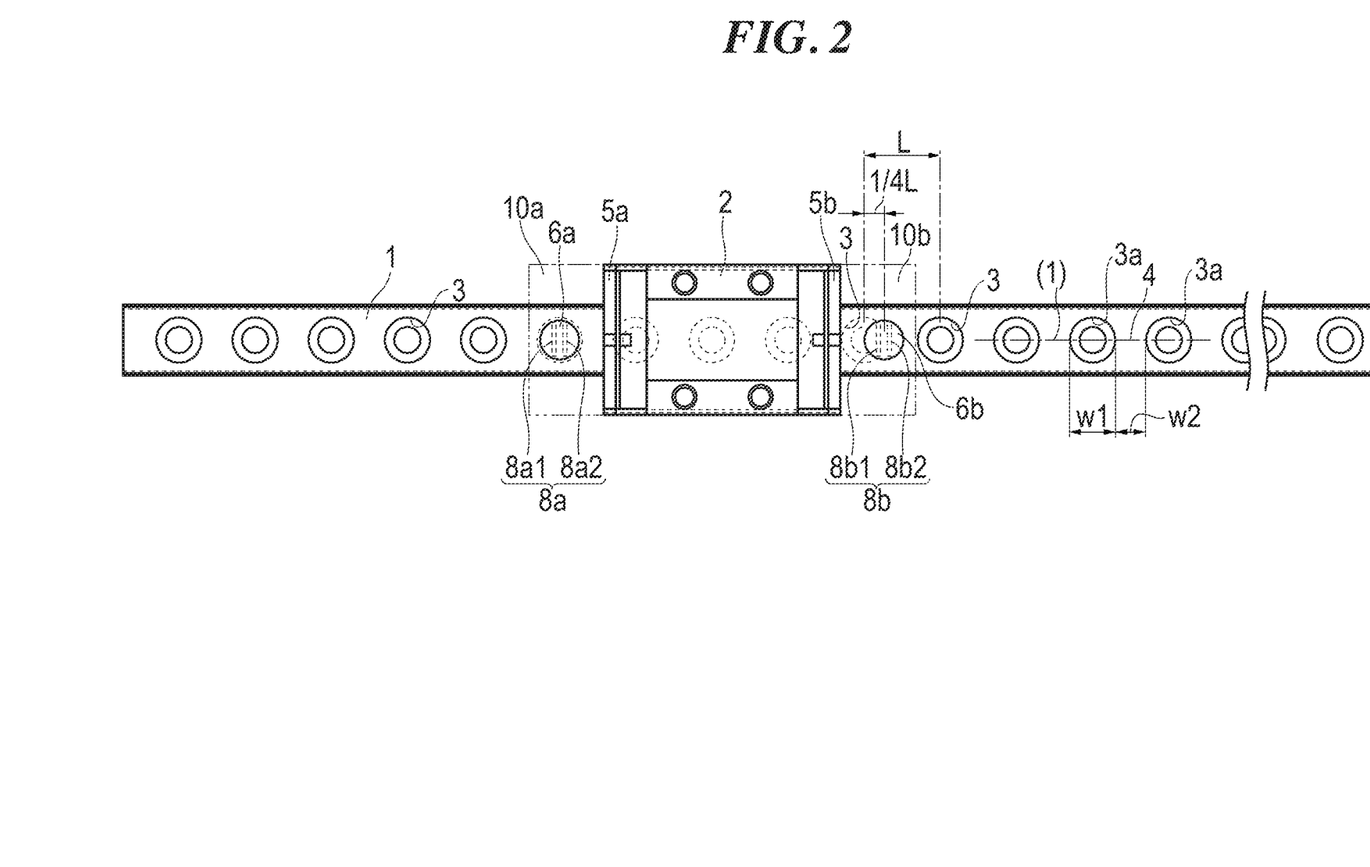
FIG. 2 is a plan view of the motion guide apparatus with the position detection apparatus.
Figure 3:
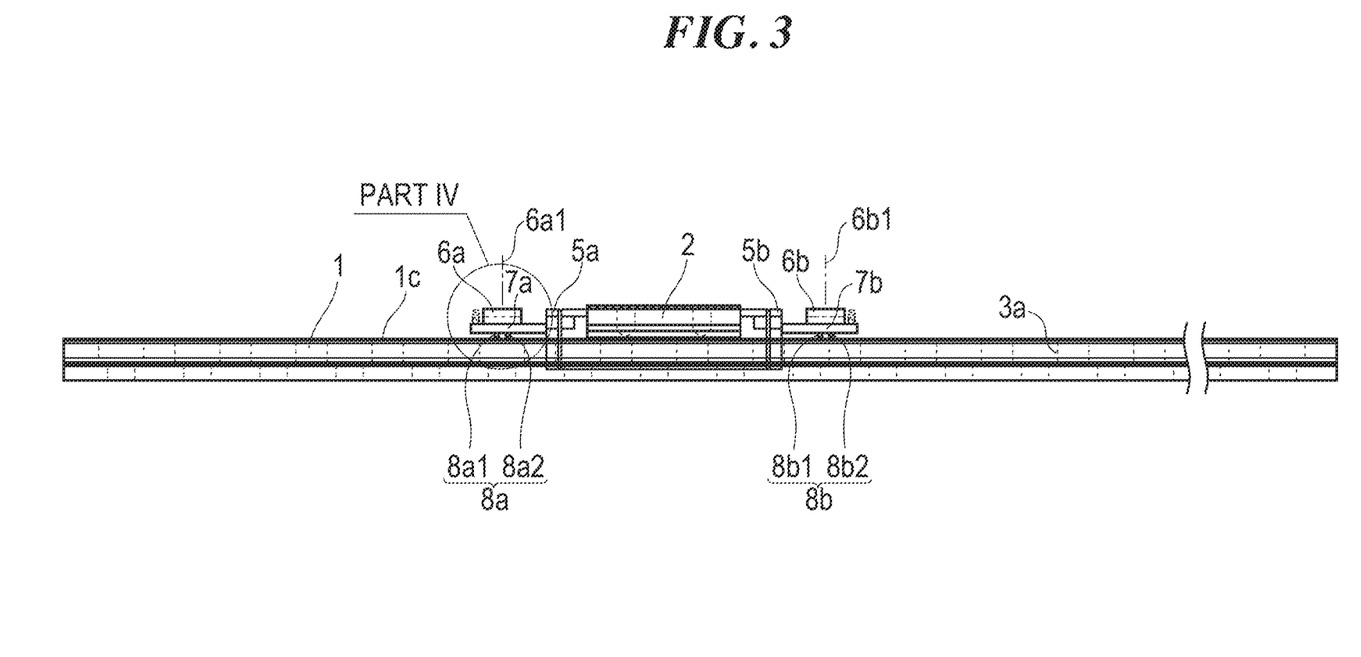
FIG. 3 is a side view of the motion guide apparatus with the position detection apparatus.

FIG. 1 illustrates an external perspective view of the motion guide apparatus with the position detection apparatus of the embodiment. FIG. 2 illustrates a plan view thereof. FIG. 3 illustrates a side view thereof. As illustrated in FIG. 1, the motion guide apparatus with the position detection apparatus includes a track rail 1 as a track member, and a block 2 as a carriage.

The track rail 1 extends long in one direction. The track rail 1 has a substantially square cross section, and includes an undersurface 1a, a pair of left and right side surfaces 1b, and an upper surface 1c in a state where the track rail 1 is assumed to be placed on a horizontal plain. The placement of the track rail 1 is not limited to such a placement, and is simply assumed for convenience of description. The material of the track rail 1 is a magnetic material such as steel.

The side surface 1*b* of the track rail 1 is provided with one or a plurality of rolling element rolling portions 1*b*1. The upper surface 1*c* of the track rail 1 is provided with a plurality of through holes 3 penetrating through to the undersurface 1*a* of the track rail 1 with a regular pitch in a longitudinal direction. Bolts as fastening members for fastening the track rail 1 to a base are run through the through holes 3. The through hole 3 is provided in the top with a countersink 3*a* for improving the stability of the head of the bolt (refer to FIGS. 2 and 3). The ratio of a width w1 of the countersink 3*a* of the through hole 3 to a width w2 of a portion 4 that is not the countersink 3*a* in a direction of a center line linking the centers of the through holes 3 (a direction (1) in FIG. 2) is set to 1:x (where 0<x<1).

As illustrated in FIG. 1, the block 2 is assembled to the track rail 1 via rolling elements such as balls or rollers in such a manner as to be capable of linear motion in a length direction of the track rail 1. The block 2 has a substantially U-shaped cross section, and includes a horizontal portion 2*a* facing the upper surface 1*c* of the track rail 1, and a sleeve portion 2*b* facing the side surfaces 1*b* of the track rail 1 and drooping from both ends in a width direction of the horizontal portion 2*a*. Moreover, the block 2 includes a steel block body 2-1 in substantially the center, and a resin portion 2-2 provided in such a manner as to surround the block body 2-1. The block 2 is provided with a plurality of track-shaped circulating paths that circulate the rolling element. The block body 2-1 is provided with a loaded rolling element rolling portion facing the rolling element rolling portion 1*b*1 of the track rail 1. The resin portion 2-2 is provided with a return path connecting one end and the other end of the loaded rolling element rolling portion. The loaded rolling element rolling portion and the return path form the circulating path. The block 2 is provided at both ends in a travel direction with foreign substance removing apparatuses 5*a* and 5*b*, such as scrapers or sealing apparatuses, that remove foreign substances adhered to the track rail 1.

Encoders 10*a* and 10*b* forming the position detection apparatuses are placed at both ends in the travel direction of the block 2, respectively. The encoders 10*a* and 10*b* include bias magnets 6*a* and 6*b* as magnets, magnetic sensors 8*a* and 8*b*, and boards 7*a* and 7*b* (refer to FIG. 3). These components 6*a*, 7*a*, and 8*a*, and 6*b*, 7*b*, and 8*b* are integrally resin cast to form the encoders 10*a* and 10*b* (refer to FIG. 1). As illustrated in FIG. 3, the bias magnets 6*a* and 6*b* are attached to upper surfaces of the boards 7*a* and 7*b*. The bias magnets 6*a* and 6*b* are circular cylinders smaller in height than their diameter. Center axes 6*a*1 and 6*b*1 of the bias magnets 6*a* and 6*b* are orthogonal to the upper surface 1*c* of the track rail 1. The bias magnets 6*a* and 6*b* are magnetized in a direction of the center axes 6*a*1 and 6*b*1. End surfaces on the track rail 1 side of the bias magnets 6*a* and 6*b* are the north poles, and the other end surfaces of the bias magnets 6*a* and 6*b* are the south poles. The bias magnets 6*a* and 6*b* generate magnetic fields toward the track rail 1 being the magnetic material.

Figure 4:
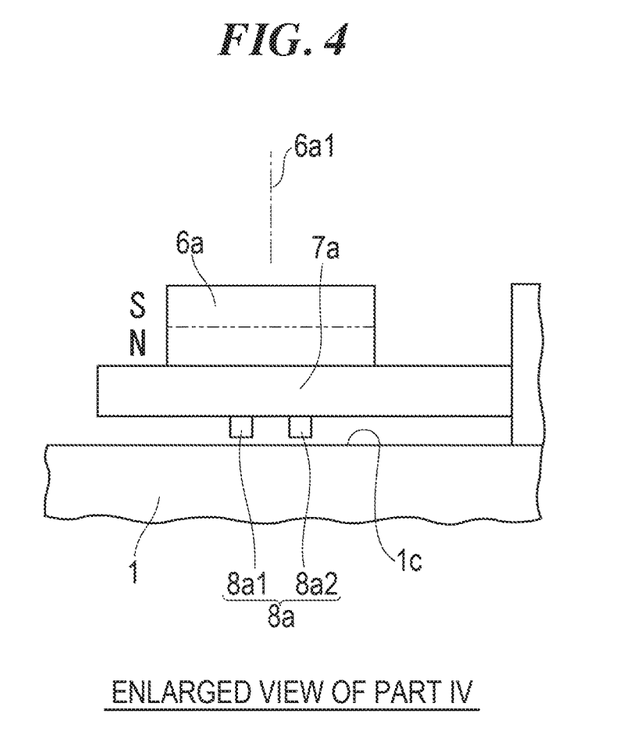
FIG. 4 is an enlarged view of a part IV of FIG. 3.

As illustrated in an enlarged view of FIG. 4, the magnetic sensors 8*a* and 8*b* are placed on undersurfaces of the boards 7*a* and 7*b*. The magnetic sensors 8*a* and 8*b* include at least two magnetic sensors 8*a*1 and 8*a*2, and 8*b*1 and 8*b*2. The magnetic sensors 8*a*1 and 8*a*2 are placed in such a manner as to be bilaterally symmetric about the center axis 6*a*1 of the bias magnet 6*a*. The magnetic sensors 8*b*1 and 8*b*2 are placed in such a manner as to be bilaterally symmetric about the center axis 6*b*1 of the bias magnet 6*b*. The magnetic sensors 8*a* and 8*b* are each formed of a magnetoresistive element or Hall effect sensor whose resistance is changed in accordance with a change in the direction of a magnetic field, and have the same sensitivity to the magnetic field. A gap is provided between the magnetic sensors 8*a* and 8*b* and the upper surface 1*c* of the track rail 1. The magnetic sensors 8*a* and 8*b* are placed in the magnetic fields of the bias magnets 6*a* and 6*b* between the bias magnets 6*a* and 6*b* and the upper surface 1*c* of the track rail 1.

Figure 5:
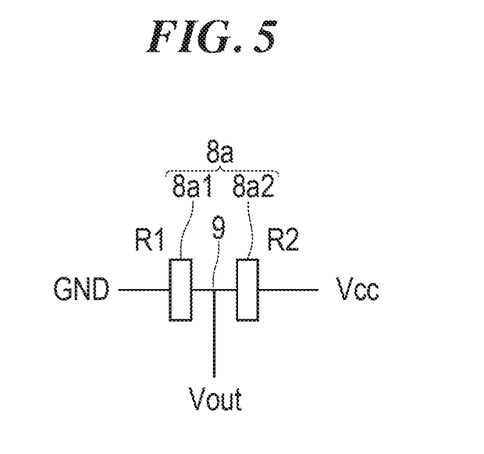
FIG. 5 is a schematic diagram illustrating the configuration of a magnetic sensor.

The block 2 travels with respect to the track rail 1. Accordingly, the direction of the magnetic field applied to the magnetic sensor 8*a* or 8*b* changes to change the resistance value of the magnetic sensor 8*a* or 8*b*. A relative position of the block 2 can be detected by outputting the change of the resistance value of the magnetic sensor 8*a* or 8*b* as a midpoint potential. FIG. 5 illustrates the configuration of the magnetic sensor 8*a*. The magnetic sensors 8*a*1 and 8*a*2 are connected in series. A power supply voltage Vcc is applied to the magnetic sensor 8*a*2. One end of the magnetic sensor 8*a*1 is grounded. The magnetic sensors 8*a*1 and 8*a*2 are connected by a midpoint terminal 9. The voltage value of the midpoint terminal 9 is outputted as the midpoint potential. The magnetic sensor 8*b* also has the same configuration. The configuration of the magnetic sensors 8*a* and 8*b* is not limited to such a half-bridge configuration as illustrated in FIG. 5, and can also use a full-bridge configuration where two half-bridge configurations are combined to further increase the sensitivity.

Figure 6:
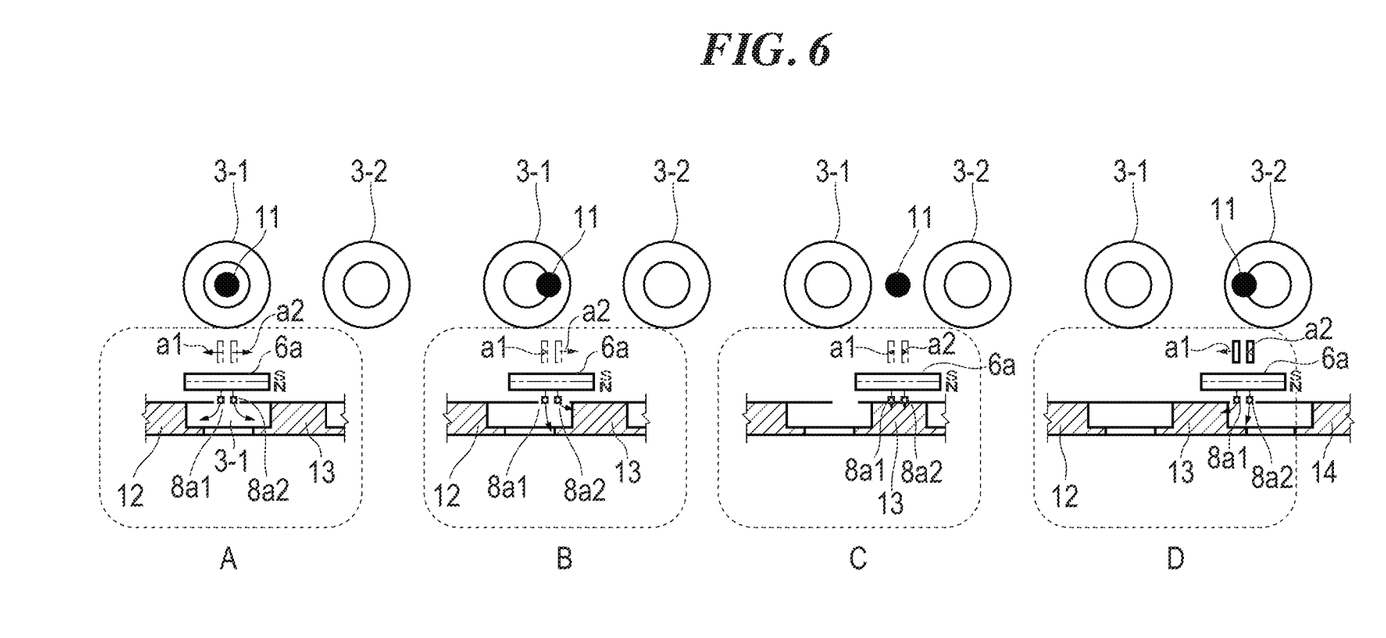
FIG. 6 is a schematic diagram illustrating changes in a magnetic field of a bias magnet with the travel of a block.

FIG. 6 is a schematic diagram illustrating changes in the magnetic field of the bias magnet 6*a* with the travel of the block 2. Reference numerals 3-1 and 3-2 denote two adjacent through holes. The upper parts illustrate plan views of the through holes 3-1 and 3-2, and the lower parts illustrate cross-sectional views of the through holes 3-1 and 3-2. A reference numeral 11 denotes the center of the bias magnet 6*a* in planar view. A, B, C, and D indicate when the bias magnet 6*a* is at the center of one of the through holes, 3-1 (A), when the bias magnet 6*a* is at a position deviating in one direction (to the right in FIG. 6) from the center of the one through hole 3-1 (B), when the bias magnet 6*a* is between the through holes 3-1 and 3-2 (C), and when the bias magnet 6*a* is at a position deviating in the other direction (to the left in FIG. 6) from the center of the other through hole 3-2 (D), respectively, during the travel of the block 2.

Firstly, when the bias magnet 6*a* is at the position (A), that is, at the center of the one through hole 3-1, the magnetic field generated by the bias magnet 6*a* points radially from the center of the through hole 3-1 to portions 12 and 13 of the magnetic material around the through hole 3-1. The magnetic sensors 8*a*1 and 8*a*2 are placed in such a manner as to be bilaterally symmetric about the center axis 6*a*1 of the bias magnet 6*a*. Accordingly, the directions of the magnetic fields applied to the magnetic sensors 8*a*1 and 8*a*2 are also bilaterally symmetric. Reference numerals a1 and a2 denote directions of the magnetic fields applied to the magnetic sensors 8*a*1 and 8*a*2 in planar view, which leads to resistance R1 of the magnetic sensor 8*a*1=resistance R2 of the magnetic sensor 8*a*2. Therefore, when Vcc is 5 V, a midpoint potential of 2.5 V is outputted (refer to FIG. 5).

Next, when the bias magnet 6*a* is at the position (B), that is, at the position deviating to the right from the center of the one through hole 3-1, the bias magnet 6*a* is closer to the portion 13 of the magnetic material than the portion 12 of the magnetic material. Accordingly, imbalance is caused in the magnetic field generated by the bias magnet 6*a*. Imbalance is also caused in the directions of the magnetic fields applied to the left and right magnetic sensors 8*a*1 and 8*a*2, which leads to the resistance R1 of the magnetic sensor 8*a*1>the resistance R2 of the magnetic sensor 8*a*2. Therefore, a midpoint potential greater than 2.5 V is outputted.

Next, when the bias magnet 6*a* is at the position (C), that is, between the through holes 3-1 and 3-2, below the bias magnet 6*a* is the portion 13 of the magnetic material. Accordingly, a magnetic field pointing down from the bias magnet 6*a* is generated. The directions of the magnetic fields applied to the magnetic sensors 8*a*1 and 8*a*2 are bilaterally symmetric, which leads to the resistance R1 of the magnetic sensor 8*a*1=the resistance R2 of the magnetic sensor 8*a*2. Therefore, a midpoint potential of 2.5 V is outputted.

Next, when the bias magnet 6*a* is at the position (D), that is, at the position deviating to the left from the center of the other through hole 3-2, the bias magnet 6*a* is closer to the portion 13 of the magnetic material than a portion 14 of the magnetic material. Accordingly, imbalance is caused in the magnetic field generated by the bias magnet 6*a*. Imbalance is also caused in the directions of the magnetic fields applied to the left and right magnetic sensors 8*a*1 and 8*a*2, which leads to the resistance R1 of the magnetic sensor 8*a*1<the resistance R2 of the magnetic sensor 8*a*2. Therefore, a midpoint potential less than 2.5 V is outputted.

Figure 7:
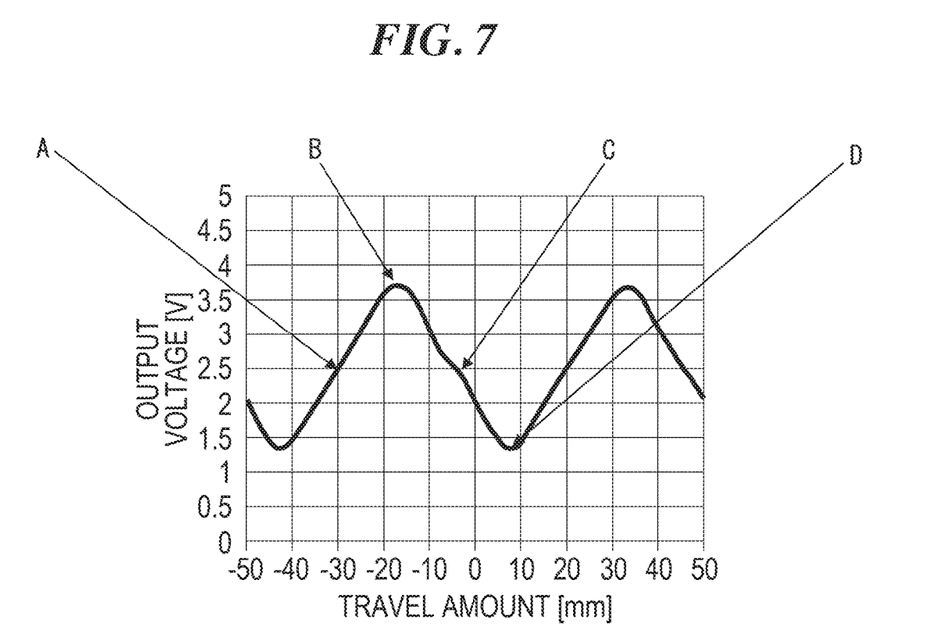
FIG. 7 is a graph illustrating changes in the output voltage of the magnetic sensor with the travel of the block.

FIG. 7 illustrates changes in the output voltage (midpoint potential) of when the bias magnet 6*a* is at the positions A, B, C, and D. The horizontal axis indicates the travel amount of the block 2, and the vertical axis indicates the output voltage (midpoint potential). The output voltage of the magnetic sensor 8*a* changes to a sine wave form with the travel of the block 2. From when the bias magnet 6*a* is at the center of the one through hole 3-1 to when the bias magnet 6*a* is at the center of the other through hole 3-2 is one period. A periodic change of the output voltage is used to enable the detection of the position of the block 2.

Figure 8:
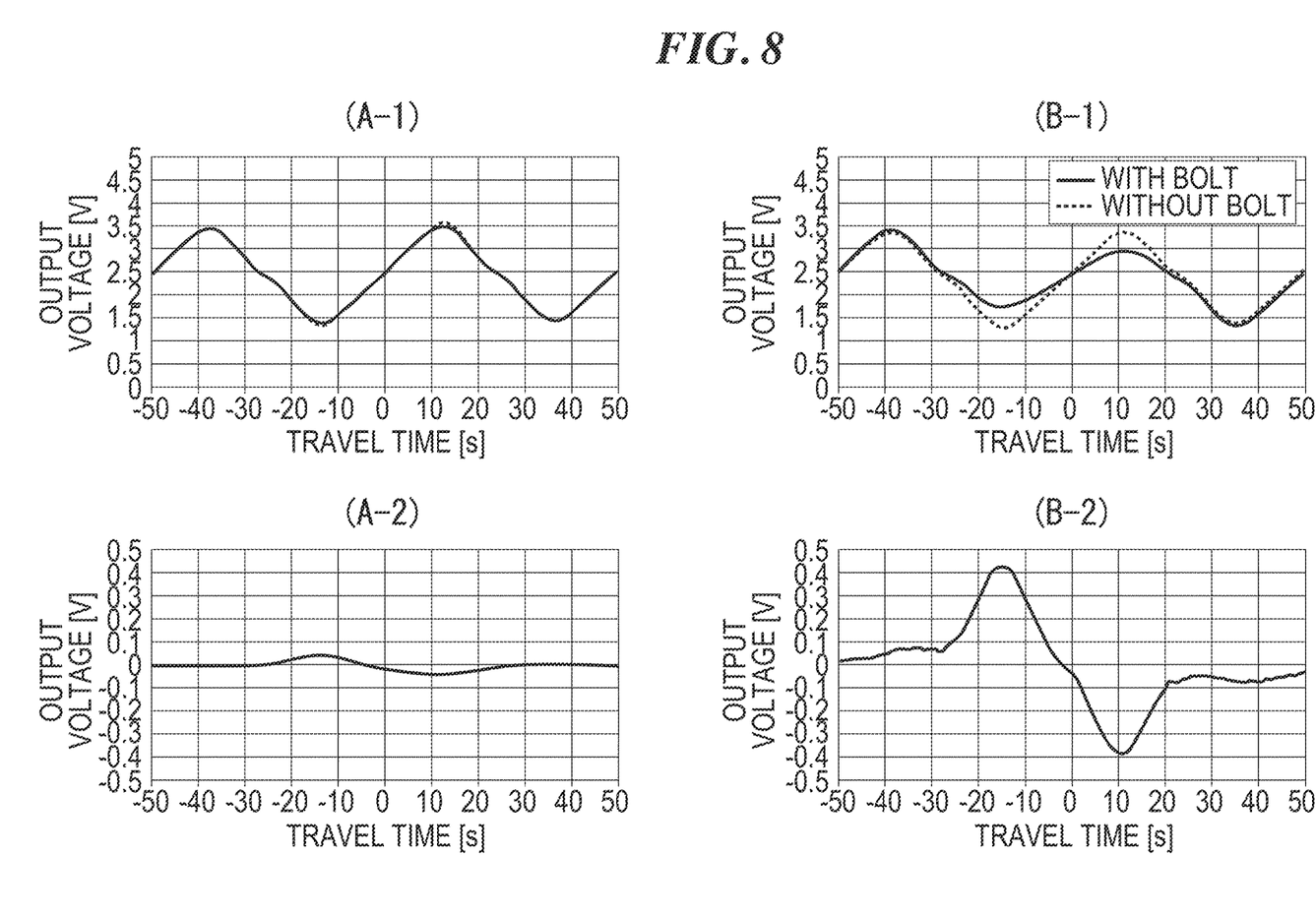
FIG. 8 is a graph where a case where a stainless bolt is used as a fastening member and a case where a steel bolt is used are compared in terms of the output voltage outputted by the magnetic sensor (FIGS. 8(A-1) and 8(A-2) are the case where the stainless bolt is used, and FIGS. 8(B-1) and 8(B-2) the case where the steel bolt is used).

FIG. 8 is a graph where a case (A-1) where a bolt made of stainless being a non-magnetic material is used as a fastening member and a case (B-1) where a steel bolt is used are compared in terms of the output voltage outputted by the magnetic sensor 8*a*. As illustrated in FIG. 8(A-1), when the stainless bolt is used, substantially the same waveform as the case where the through hole 3 is empty (that is, without the bolt) is obtained. As illustrated in FIG. 8(A-2), an output difference between the case with the bolt and the case without the bolt is also substantially zero.

In contrast, as illustrated in FIG. 8(B-1), when the steel bolt is used, a peak value of the output voltage is lower than the case where the through hole 3 is empty (that is, without the bolt). As illustrated in FIG. 8(B-2), the output difference between the case with the bolt and the case without the bolt is large. The use of the stainless bolt as the fastening member enables an influence on the output voltage of the magnetic sensor 8*a* to be substantially eliminated. A resin bolt can also be used as a fastening member of a non-magnetic material.

Figure 9:
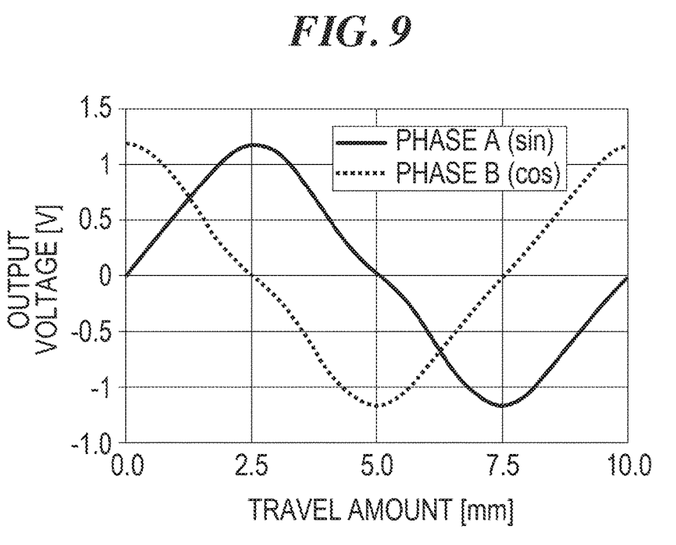
FIG. 9 is a graph illustrating a Phase A and a Phase B signal outputted by a pair of encoders provided at both ends of the block.

As illustrated in FIG. 2, the encoders 10*a* and 10*b* are placed at both ends in the travel direction of the block 2, respectively. When the bias magnet 6*a* of one of the encoders, 10*a*, is at the center of the through hole 3, the bias magnet 6*b* of the other encoder 10*b* is at a position deviating a quarter of a pitch L between the through holes 3 from the center of the through hole 3. Hence, as illustrated in FIG. 9, the magnetic sensor 8*a* of the one encoder 10*a* outputs a sine wave Phase A signal, and the magnetic sensor 8*b* of the other encoder 10*b* outputs a cosine wave Phase B signal that is out of phase with the Phase A signal by 90 degrees.

Figure 10:
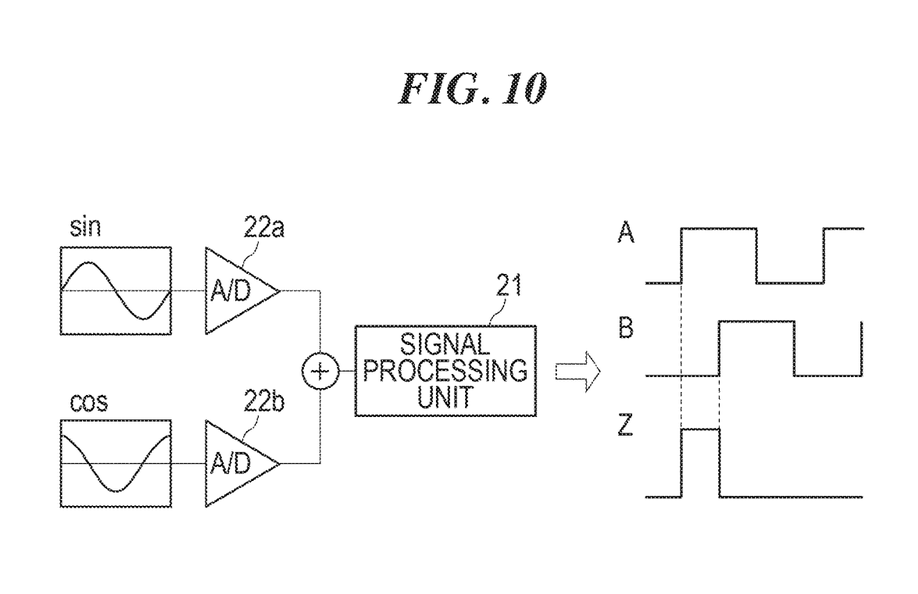
FIG. 10 is a schematic diagram illustrating a signal processing unit of the position detection apparatus.

The Phase A and Phase B signals outputted by the magnetic sensors 8*a* and 8*b* are processed as follows: as illustrated in FIG. 10, the Phase A and Phase B signals are transmitted to a signal processing unit 21 of the position detection apparatus. The signal processing unit 21 performs an interpolation process on the Phase A and Phase B signals to output high-precision phase angle data.

Figure 11:
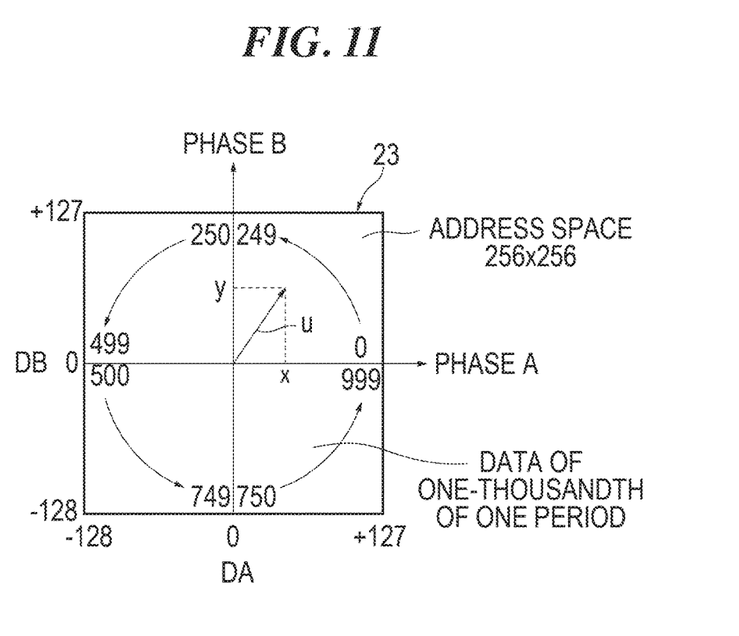
FIG. 11 is a schematic diagram illustrating a lookup table memory.

This is described in detail. The Phase A and Phase B signals are inputted into A/D converters 22*a* and 22*b*. The A/D converters 22*a* and 22*b* sample the Phase A and Phase B signals in a predetermined period to obtain digital data DA and DB. As illustrated in FIG. 11, lookup table data created on the basis of the following equation using an inverse tangent function (arctan) is previously recorded in a lookup table memory 23 of the signal processing unit 21.

$$u = \arctan(DB/DA)$$

FIG. 11 illustrates a memory configuration of the lookup table memory 23 in a case where an address space of 8 bits×8 bits has phase angle data of one-thousandth of one period. The signal processing unit 21 searches the lookup table data, using the digital data DA and DB as x and y addresses, respectively, and obtains phase angle data u corresponding to the x and y addresses. Consequently, division and interpolation is possible within one wavelength (a section from 0 to $2\pi$). Instead of using the lookup table memory 23, division/interpolation is also possible within one wavelength (the section from 0 to $2\pi$) by computing u=arctan (DB/DA) and calculating the phase angle data u. The signal processing unit 21 generates a Phase A pulse signal and a Phase B pulse signal from the phase angle data u, and generates a Phase Z pulse signal in every period. The Phase A pulse signal, the Phase B pulse signal, and the Phase Z pulse signal outputted by the signal processing unit 21 are used to control the position of a movable body such as a table.

Up to this point the configuration of the motion guide apparatus with the position detection apparatus of the embodiment has been described. The motion guide apparatus with the position detection apparatus of the embodiment takes the following effects:

The through holes 3 of the track rail 1 are used as the scale. Accordingly, the space to affix the scale to the track rail 1 is not required. Moreover, the track rail 1 itself is the scale; therefore, an inexpensive position detection apparatus is obtained.

The fastening member is a stainless bolt. Accordingly, it is possible to substantially eliminate the influence of the fastening member on the output voltages of the magnetic sensors 8*a* and 8*b*.

The magnetic sensors 8*a* and 8*b* are placed between the bias magnets 6*a* and 6*b* and the track rail 1. Accordingly, the magnetic sensors 8*a* and 8*b* can detect changes in the directions of magnetic fields of the bias magnets 6*a* and 6*b* with high sensitivity.

The encoders 10*a* and 10*b* are placed at both ends in the travel direction of the block 2, respectively, and the Phase A signal and the Phase B signal are outputted. Accordingly, the position of the block 2 can be detected with high precision. Moreover, the encoders 10*a* and 10*b* are placed at both ends in the travel direction of the block 2, respectively. Accordingly, a reduction in the size of the encoders 10*a* and 10*b* can also be encouraged. As described above, when the bias magnet 6*a* of one encoder 10*a* is at the center of the through hole 3, the bias magnet 6*b* of the other encoder 10*b* is at the position deviating a quarter of the pitch L between the through holes 3 from the center of the through hole 3. If the encoders 10*a* and 10*b* are placed only on one side in the travel direction of the block 2, when the pitch L between the through holes 3 is small, it is necessary to set a pitch between the magnetic sensors 8*a* and 8*b* to, for example, 5/4L, and the size of the encoders 10*a* and 10*b* is likely to increase.

When two blocks 2 and 2 are assembled to the same track rail 1, it is also possible to assemble the encoder 10a or 10b to each of the two blocks 2 and 2, and output the Phase A signal and the Phase B signal. When the table is placed on the block 2, the encoders 10a and 10b may not be able to be placed at both ends in the travel direction of the block 2, respectively, or the assembling work may be difficult. The encoder 10a or 10b is assembled to each of the two blocks 2 and 2 on the same track rail 1 to enable the solution of this problem. Naturally, three or more blocks 2 . . . can also be assembled to the same track rail 1.

The ratio of the width w1 of the countersink 3a of the through hole 3 to the width w2 of the portion 4 that is not the countersink 3a in the direction of the center line linking the centers of the through holes 3 of the track rail 1 is set to 1:x (where 0<x<1). Accordingly, the waveform of the output voltages of the magnetic sensors 8a and 8b can be converted into the sine wave.

Foreign substances of the magnetic material are scraped by the foreign substance removing apparatuses 5a and 5b provided to the block 2. Accordingly, it is possible to prevent the foreign substances from adversely affecting the output voltages of the magnetic sensors 8a and 8b.

The present invention is not limited to the realization of the embodiment, and can be changed to various embodiments within the scope that does not change the gist of the present invention.

For example, the shape of the bias magnet, the number of the magnetic sensors, and the positional relationship between the bias magnet and the magnetic sensor of the embodiment are examples, and other configurations can be employed within the scope that does not change the gist of the present invention.

Moreover, the configurations of the track rail and the block are examples, and other configurations can be employed within the scope that does not change the gist of the present invention.

In the embodiment, the encoder is attached to the block. However, the encoder can also be attached to a movable body such as a table.

The description is based on Japanese Patent Application No. 2015-211543 filed on Oct. 28, 2015, the entire contents of which are incorporated herein.

REFERENCE SIGNS LIST

1 Track rail (track member)
2 block (carriage)
3 Through hole
3a Countersink
4 Portion that is not the countersink of the track rail
6a, 6b Bias magnet (magnet)
8a, 8b Magnetic sensor

The invention claimed is:

1. A position detection apparatus comprising:
   a track member including a through hole where a fastening member to fasten the track member to a base is insertable, to which a carriage is movably assembled via a rolling element;
   a magnet generating a magnetic field toward the track member; and
   a magnetic sensor placed within the magnetic field, the magnetic sensor being configured to detect a change in the magnetic field of the magnet with the travel of the magnet relative to the track member.

2. The position detection apparatus according to claim 1, wherein the fastening member is a non-magnetic material.

3. The position detection apparatus according to claim 1, wherein the magnetic sensor is placed between the magnet and the track member.

4. The position detection apparatus according to claim 1, wherein the magnet and the magnetic sensor are placed at each end in a travel direction of the carriage in such a manner as to output a Phase A signal and a Phase B signal out of phase with each other by 90 degrees.

5. The position detection apparatus according to claim 1, wherein
   two carriages are assembled to the same track member, and
   the magnet and the magnetic sensor are assembled to each of the two carriages in such a manner as to output a Phase A signal and a Phase B signal out of phase with each other by 90 degrees.

6. The position detection apparatus according to claim 1, wherein
   the track member includes at least two through holes in a length direction of the track member, and
   the ratio of a width of a countersink of the through hole to a width of a portion that is not the countersink in a direction of a center line linking the centers of the at least two through holes is set to 1:x, where 0<x<1.

7. A motion guide apparatus with a position detection apparatus comprising:
   the position detection apparatus according to claim 1; and
   a motion guide apparatus including the track member and the carriage.

8. The position detection apparatus according to claim 2, wherein the magnetic sensor is placed between the magnet and the track member.

9. The position detection apparatus according to claim 2, wherein the magnet and the magnetic sensor are placed at each end in a travel direction of the carriage in such a manner as to output a Phase A signal and a Phase B signal out of phase with each other by 90 degrees.

10. The position detection apparatus according to claim 3, wherein the magnet and the magnetic sensor are placed at each end in a travel direction of the carriage in such a manner as to output a Phase A signal and a Phase B signal out of phase with each other by 90 degrees.

11. The position detection apparatus according to claim 8, wherein the magnet and the magnetic sensor are placed at each end in a travel direction of the carriage in such a manner as to output a Phase A signal and a Phase B signal out of phase with each other by 90 degrees.

12. The position detection apparatus according to claim 2, wherein
   two carriages are assembled to the same track member, and
   the magnet and the magnetic sensor are assembled to each of the two carriages in such a manner as to output a Phase A signal and a Phase B signal out of phase with each other by 90 degrees.

13. The position detection apparatus according to claim 3, wherein
   two carriages are assembled to the same track member, and
   the magnet and the magnetic sensor are assembled to each of the two carriages in such a manner as to output a Phase A signal and a Phase B signal out of phase with each other by 90 degrees.

14. The position detection apparatus according to claim 8, wherein
   two carriages are assembled to the same track member, and the magnet and the magnetic sensor are assembled to each of the two carriages in such a manner as to output a Phase A signal and a Phase B signal out of phase with each other by 90 degrees.

15. The position detection apparatus according to claim 2, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

16. The position detection apparatus according to claim 3, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

17. The position detection apparatus according to claim 4, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

18. The position detection apparatus according to claim 5, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

19. The position detection apparatus according to claim 8, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

20. The position detection apparatus according to claim 9, wherein
the track member includes at least two through holes in a length direction of the track member, and
the ratio of a width of a countersink of the through hole to a width of a portion that is not the countersink in a direction of a center line linking the centers of the at least two through holes is set to 1:x, where 0<x<1.

* * * * *